United States Patent [19]
Horie et al.

[11] Patent Number: 5,777,316
[45] Date of Patent: Jul. 7, 1998

[54] IC MEMORY CARD HAVING AN IMPROVED ENGAGING MEANS FOR HOLDING A BATTERY HOLDER

[75] Inventors: Naoya Horie, Neyagawa; Akira Nezu, Nara; Yoshiaki Imanishi, Kadoma, all of Japan

[73] Assignee: Matsushita Electric Industrial Co., Ltd., Kadoma, Japan

[21] Appl. No.: 605,888

[22] Filed: Feb. 23, 1996

[30] Foreign Application Priority Data

Feb. 24, 1995 [JP] Japan ................................. 7-036842

[51] Int. Cl.$^6$ ........................................... G06K 7/00
[52] U.S. Cl. ........................... 235/486; 235/492; 429/97
[58] Field of Search ........................ 235/492, 375, 235/486, 487; 206/203, 704; 429/96, 97, 98, 100

[56] References Cited

U.S. PATENT DOCUMENTS

| | | | |
|---|---|---|---|
| 4,146,682 | 3/1979 | Nakao | 429/97 |
| 4,774,399 | 9/1988 | Fujita et al. | 235/492 X |
| 4,797,542 | 1/1989 | Hara | 235/492 X |
| 4,842,966 | 6/1989 | Omori et al. | 429/96 |
| 4,868,074 | 9/1989 | Omori et al. | 429/98 |
| 4,893,001 | 1/1990 | Ohkubo et al. | 235/492 X |
| 5,039,580 | 8/1991 | Mori et al. | 429/97 |
| 5,225,293 | 7/1993 | Mitchell et al. | 429/97 |
| 5,529,503 | 6/1996 | Kerklaan | 235/492 X |
| 5,552,240 | 9/1996 | Derstine | 429/97 X |
| 5,568,364 | 10/1996 | Madden | 361/752 |

FOREIGN PATENT DOCUMENTS 2651592  3/1991  France .

*Primary Examiner*—Donald T. Hajec
*Assistant Examiner*—Michael G. Lee
*Attorney, Agent, or Firm*—Cushman Darby & Cushman IP Group of Pillsbury Madison & Sutro LLP

[57] ABSTRACT

An IC memory card having an improved battery engaging member for holding a batter holder is provided. The IC memory card includes a casing having a space for holding a batter holder. A resilient engaging member on the side of the battery holder configured to engage the casing is provided. An engagement releasing member in the casing is configured to push the resilient engaging member so that the battery holder can be removed from the casing.

4 Claims, 6 Drawing Sheets

IC MEMORY CARD HAVING AN IMPROVED ENGAGING MEANS FOR HOLDING A BATTERY HOLDER

FIELD OF THE INVENTION AND RELATED ART STATEMENT

1. Field of the Invention

The present invention relates to an IC memory card which contains IC memories and memory backup battery, and particularly to an IC memory card of battery changeable type.

The present invention is, more specifically, relates to an IC memory card having an improved battery engaging means for holding a battery holder.

2. Description of the Related Art

In recent years, IC memory cards have been utilized as portable information memory media containing memory IC's as memory means such as RAM's or ROM's in various fields. Among them, those IC memory cards using a battery for holding data memorized in IC memories and having such a means through which battery change is possible are convenient and used in various applications.

In the following, referring to the drawings, explanation is given on a battery holding means of conventional battery changeable type IC memory cards.

Firstly, explanation is given on a battery changeable type IC memory card of prior art shown in FIG. 3. In a casing 1 of the memory IC card, a printed-circuit board 2 is installed. The printed-circuit board 2 is loaded with a memory IC, a decoding IC, connectors and the like (neither is shown in the figure), and contact leads 3 and 4 of resilient metal plates for connection use to a battery are fixed on the printed circuit board 2. On the front face and the back face of the plastic frames 5 and 5' made of plastic molding in the casing 1, a front cover plate 6 and a back cover plate 7 made of metal plate of such as aluminum are fixed. A pocket-shaped hollow space 8 opened at one end part of the casing 1 is formed being defined by side walls 30 and 31 which are part of the molded frames 5 and 5' and front and back cover plates 6 and 7. To a battery loading space 33 formed in a pocket shape in a battery holder 32, a battery 9 is loaded. The battery holder 32 is stored in the recessed space 8 which is a storing space for the battery holder in the casing. In the recessed part 8 of the casing, on the front face and the back face of the battery 9, the contact leads 3 and 4 make contact respectively therewith by their resilient action. An engagement projection 34a is provided on the plastic resilient engaging member 34 for the battery engagement use formed on a lower part of the side wall of the battery holder 32. The engagement projection 34a engages with an engaging recess part 35 provided on the side wall 30 of the casing recessed space 8. On the tip of the resilient engaging member 34, a releasing handle piece 36 is provided so as to be operable by hitching using such as finger nail tip. At such part of the recessed part 8 of the casing 1 that is opened to the edge part of the casing 1, a very thin gap 37 is provided between the outside edge of the side wall 30 and the releasing handle piece 36.

When the replacement of the battery 9 is intended, by inserting the finger nail tip into the gap 37, the releasing handle piece 36 is pushed lightly toward the left side of the figure. Thus the resilient engaging member 34 is distorted obliquely toward the left side, thereby the projection 34a is made released from the engagement recessed part 35. Keeping this state, the battery holder 32 is pulled out downwards of FIG. 3 and taken out, and thereby the battery replacement is accomplished.

In the conventional structure as shown in FIG. 1, however, the releasing handle piece 36 for releasing the engaging state is provided on the battery holder 32 itself. Accordingly, when the memory IC card is pulled out from an apparatus such as a personal computer in which the card is installed, there is a danger that it may cause mistakenly hitching the releasing piece by a finger and accidentally pulling out the battery holder 32. Further, since the gap 37 is formed between the releasing handle piece 36 and the side wall of the recessed space of the casing, when the releasing piece 36 is touched by an unexpected object on the occasion of carrying the apparatus, the battery holder 32 in the apparatus is easily released from the casing. When the battery holder 32 is released, holding of data memorized in the IC memory card becomes unable.

OBJECT AND SUMMARY OF THE INVENTION

The prior art has such the drawback that as has been described above, the battery may be removed accidentally. And it was a subject to solve this.

Thus the present invention is to solve the above-mentioned problem, and it purposes to offer an IC memory card having a battery holding structure, by which the loading and unloading of a battery is easy and the lock thereof is reliable.

In order to accomplish the above-mentioned object, in the present invention, a resilient engaging member is provided on one side part of the battery holder, and on this resilient engaging member an engaging projection for making engagement with respect to an engaging spot is provided; and inside the casing, a releasing member for releasing the above engagement between the engaging projection and the engaging spot is provided.

Describing in more detail, the IC memory card of the present invention includes therein a memory means, and comprises;

a casing for containing a memory means and a pocket-shaped insertion space, a battery holder to be slidingly inserted to be held in the above-mentioned insertion space for holding at least one battery for feeding electric power to said memory means, a resilient engaging member provided on a side part of the above-mentioned battery holder and having an engaging projection to make an engagement with an engaging spot of the above-mentioned casing, and an engagement releasing member for releasing the above-mentioned engagement of the above-mentioned engaging projection with the above-mentioned engaging spot by pushing.

In a more concrete mode of the invention, the above-mentioned engagement releasing member is provided with a sliding part which is slid in the right-angled direction with respect to the slidingly inserting direction of the above-mentioned battery holder, a sliding part which pushes to move the above-mentioned resilient engaging member by its tip part, and a sliding handle piece by which the above-mentioned sliding part is handled.

In a more concrete mode of the invention, the above-mentioned engagement releasing member is provided with sliding control means at two positions substantially taking place at its sliding process respectively in one sliding direction and its opposite sliding direction at which it is click-stopped with respect to the casing.

In a more concrete mode of the invention, the above-mentioned casing is provided with a holding hole holding the pushing end for the use of pushing the above-mentioned engaging projection and the insertion part provided on the opposite end both of the above-mentioned sliding part.

In the present invention, in accordance with the above constitution, the resilient engaging member of the battery holder is positioned inside the insertion space for the battery holding means and in a further inside position than an insertion opening part of the insertion space at the casing bottom end. That is, the resilient engaging member neither is exposed on the bottom face of the casing, nor the tips of the resilient engaging members from any operating part. Therefore, even when a tip part of the resilient engaging members is mistakenly hitched by a finger for example, there is no danger of occurrence of the engagement releasing and of any escaping of the battery holder from the casing.

When the battery replacement is intended, it is carried out by moving a sliding handle piece of the engagement releasing member to the releasing-side position. That is, by the moving operation of the sliding handle piece to the releasing position, the resilient engaging member is pushed toward the position shown in FIG. 2 by a pushing part on the tip of the engagement releasing member. Thereby the engagement between the engaging projection on the tip part of the resilient engaging member and the engaging spot is released. By this engagement releasing, the battery holder can be taken out downwards of FIG. 1.

And when the battery holder is taken out downward from the casing, a tapered edge formed by temporarily bent resilient engaging member automatically pushes back the pushing part of the engagement releasing member. Therefore, the engagement releasing member is automatically restored to the engaging position from the releasing side position.

And, when the battery holder is going to be inserted into the casing, the battery holder is simply inserted into the insertion space in the casing. Thereby the tip of the engagement releasing member is pushed by a tapered part of the resilient engaging member and it comes back to its engaging-state position automatically. In such a manner as described above, when the battery holder is restored, the engagement state (locked state) can be attained simply by inserting it lightly using finger into the insertion space. Therefore, any careless omission of locking operation of the engagement releasing member cannot happen, and thereby any unexpected release of the battery holder cannot occur. On the operation of the engagement releasing member, it is only necessary to move it strongly toward the releasing position by the sliding handle piece only in case of taking out the battery. Therefore, any careless omission of engagement operation can be avoided, and hence the battery holder cannot be released in so far as it is not intended. Accordingly in the IC memory card of the present invention, memorized data can be held reliably, and also the battery replacement operation becomes simple and reliable.

When the novel features of the invention are set forth particularly in the appended claims, the invention, both as to organization and content, will be better understood and appreciated, along with other objects and features thereof, from the following detailed description taken in conjunction with the drawings.

Figure 1:
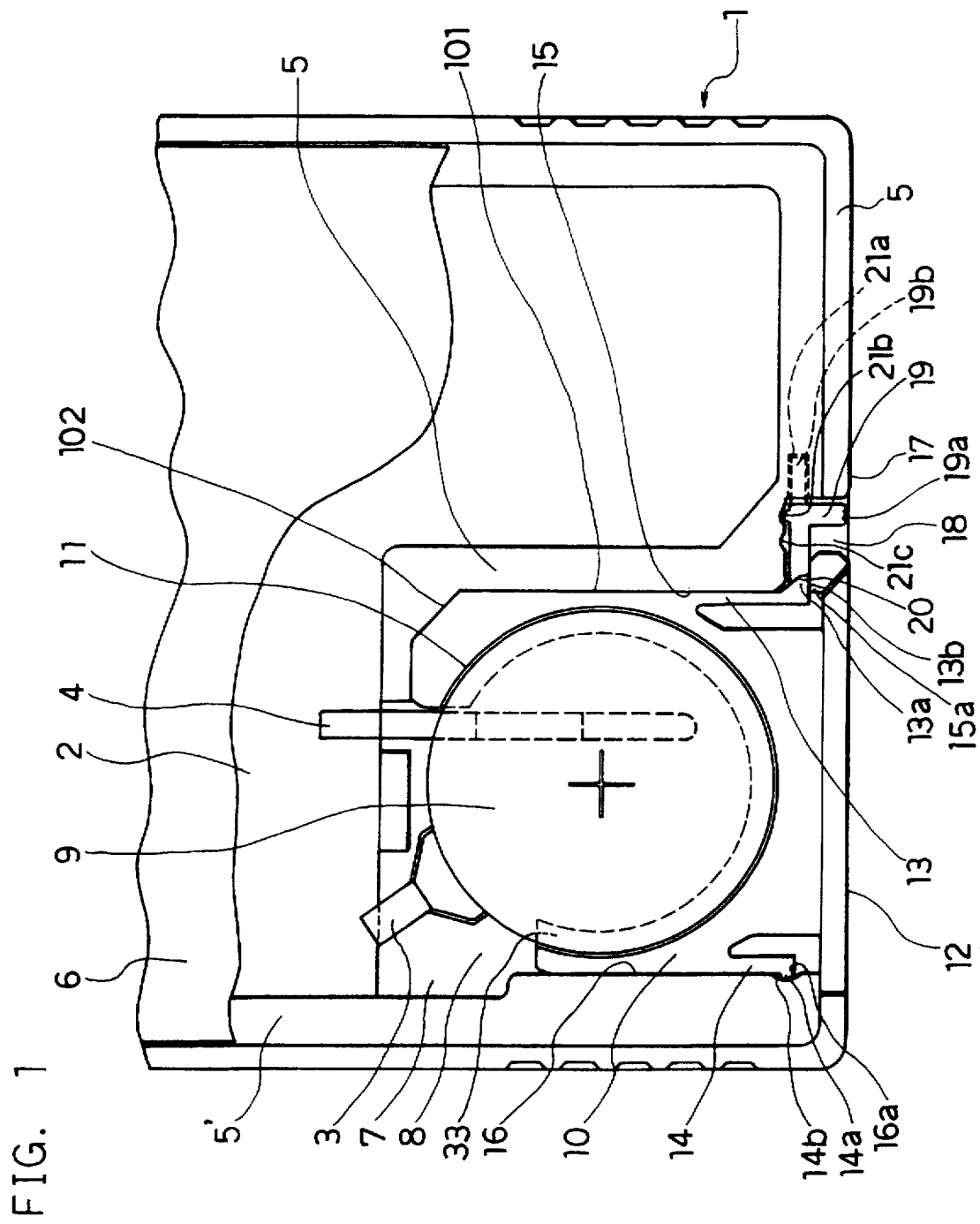
FIG. 1 is a partial plan view of the IC memory card in one embodiment of the present invention.

It will be recognized that some or all of the Figures are schematic representations for purposes of illustration and do not necessarily depict the actual relative sizes or locations of the elements shown.

DESCRIPTION OF THE PREFERRED EMBODIMENTS

In the following, on the preferred embodiments of the present invention, detailed explanation is given referring to the drawings.

Figure 1A:
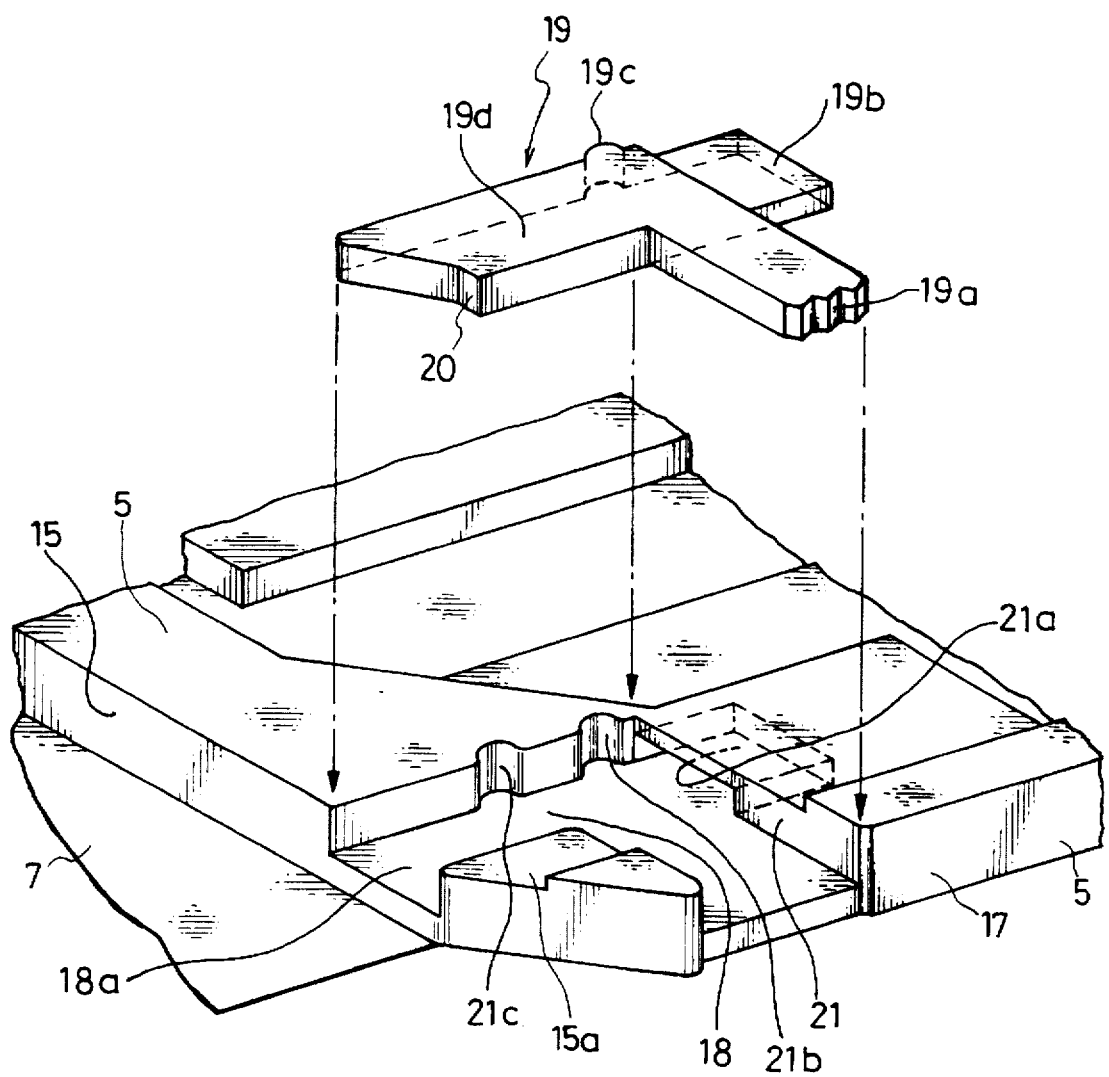
FIG. 1A is an expanded perspective view of the structure of the engagement releasing member (19) of the central bottom part of FIG. 1.
Figure 1B:
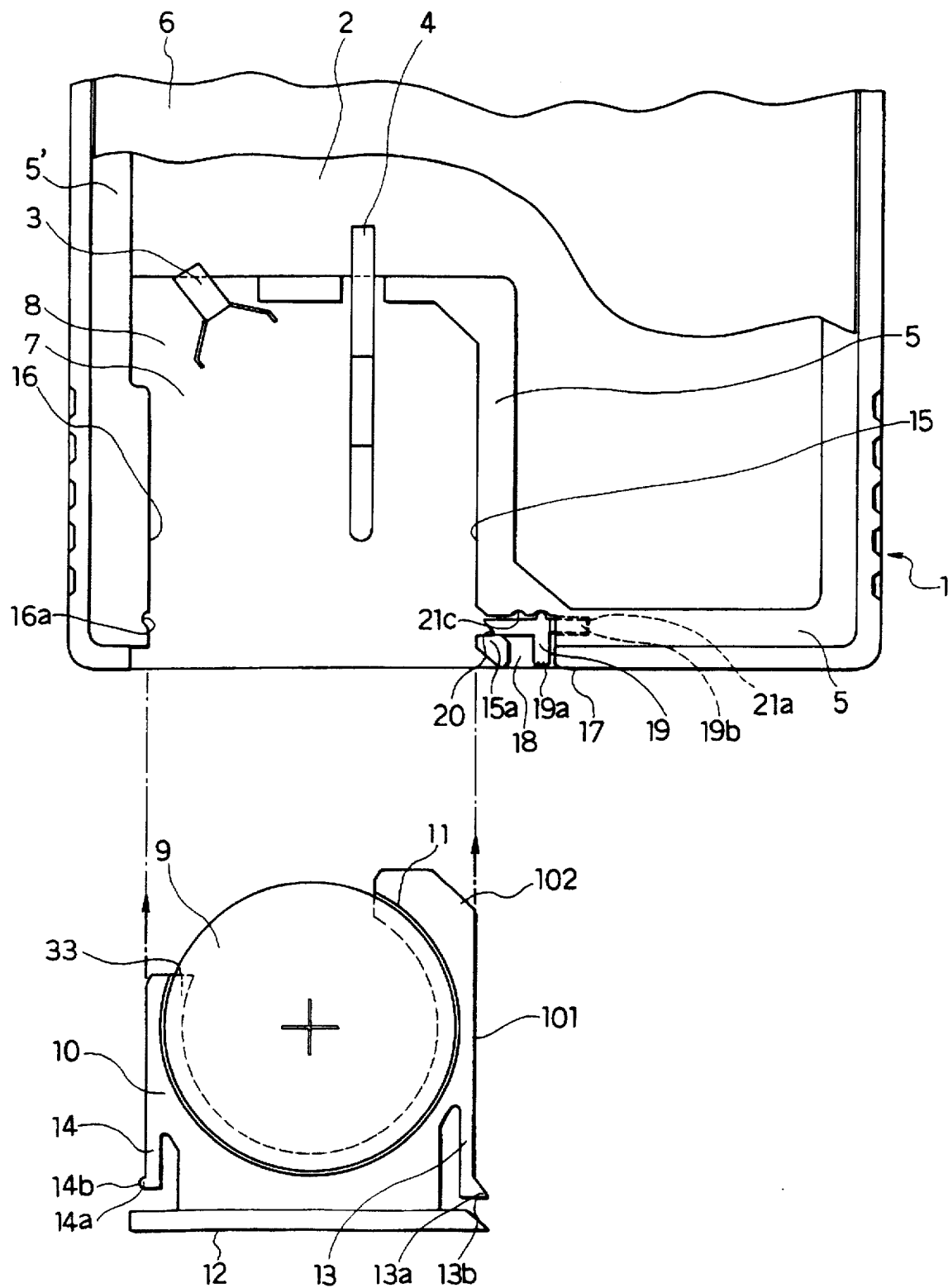
FIG. 1B is a partial plan view of the IC memory card of FIG. 1 with its battery holder 1C taken out from its casing 1.
Figure 1C:
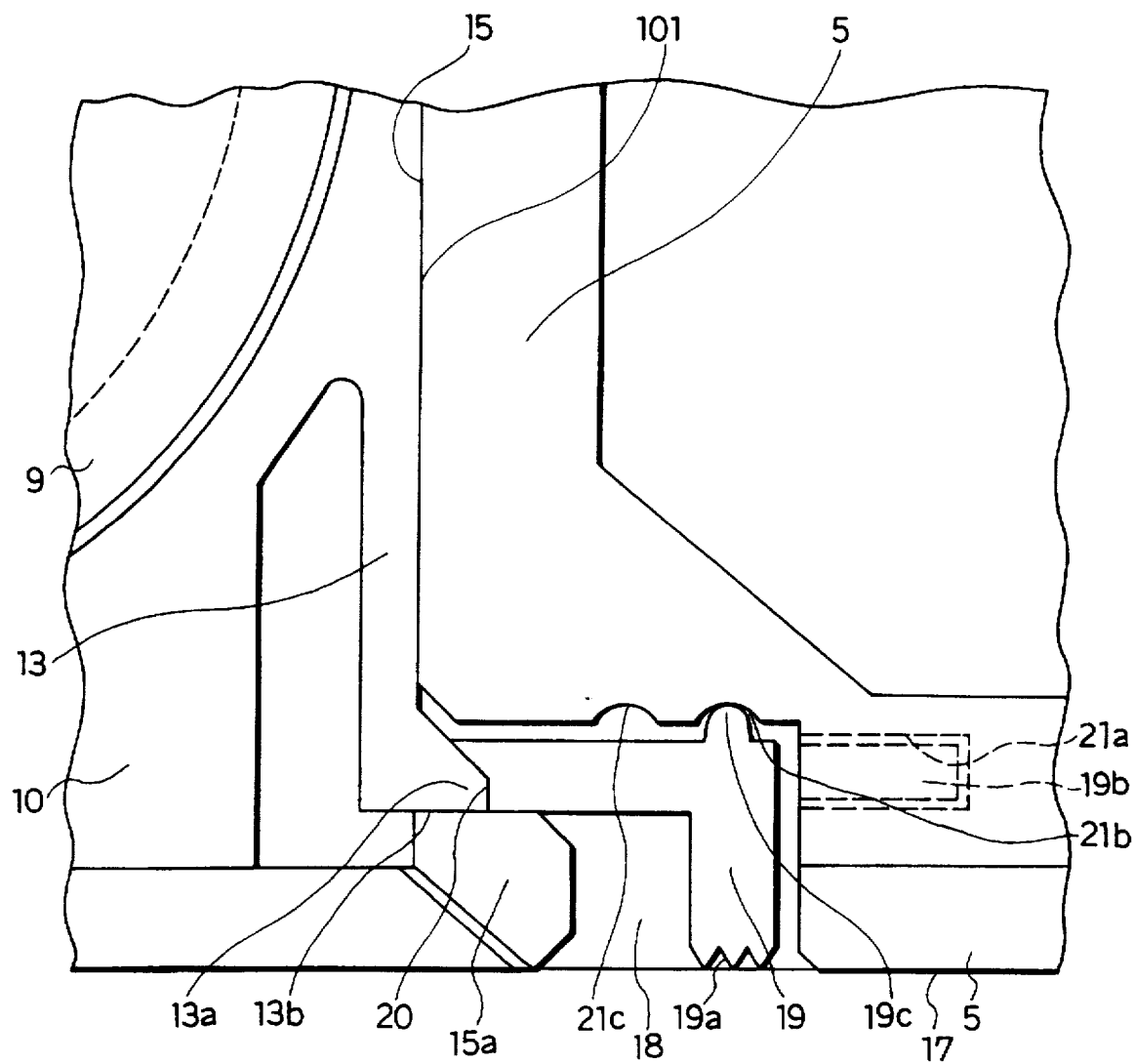
FIG. 1C is an enlarged plan view of the lower center part of the IC memory card of FIG. 1.
Figure 2:
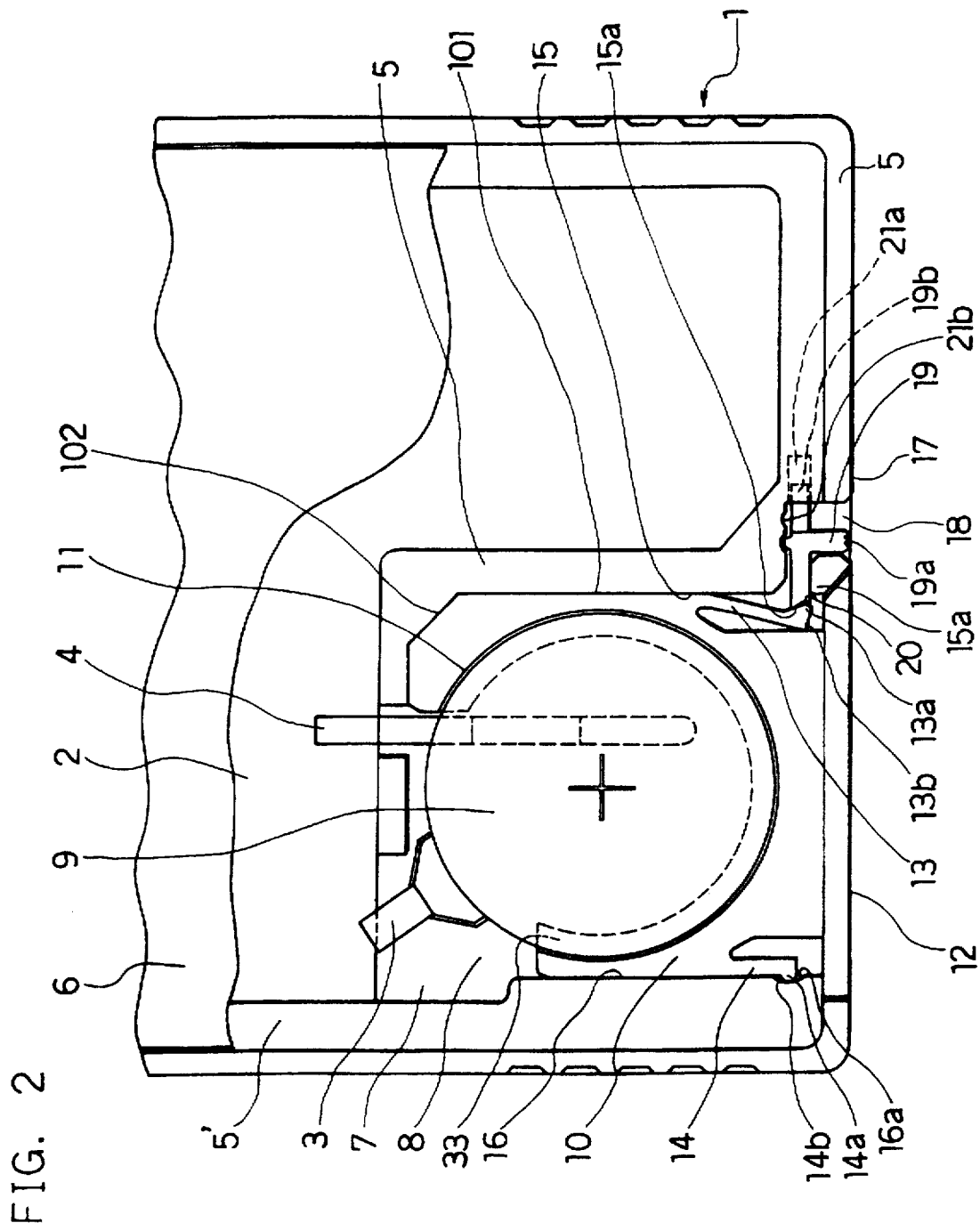
FIG. 2 is a partial plan view in the engagement releasing state.
Figure 3:
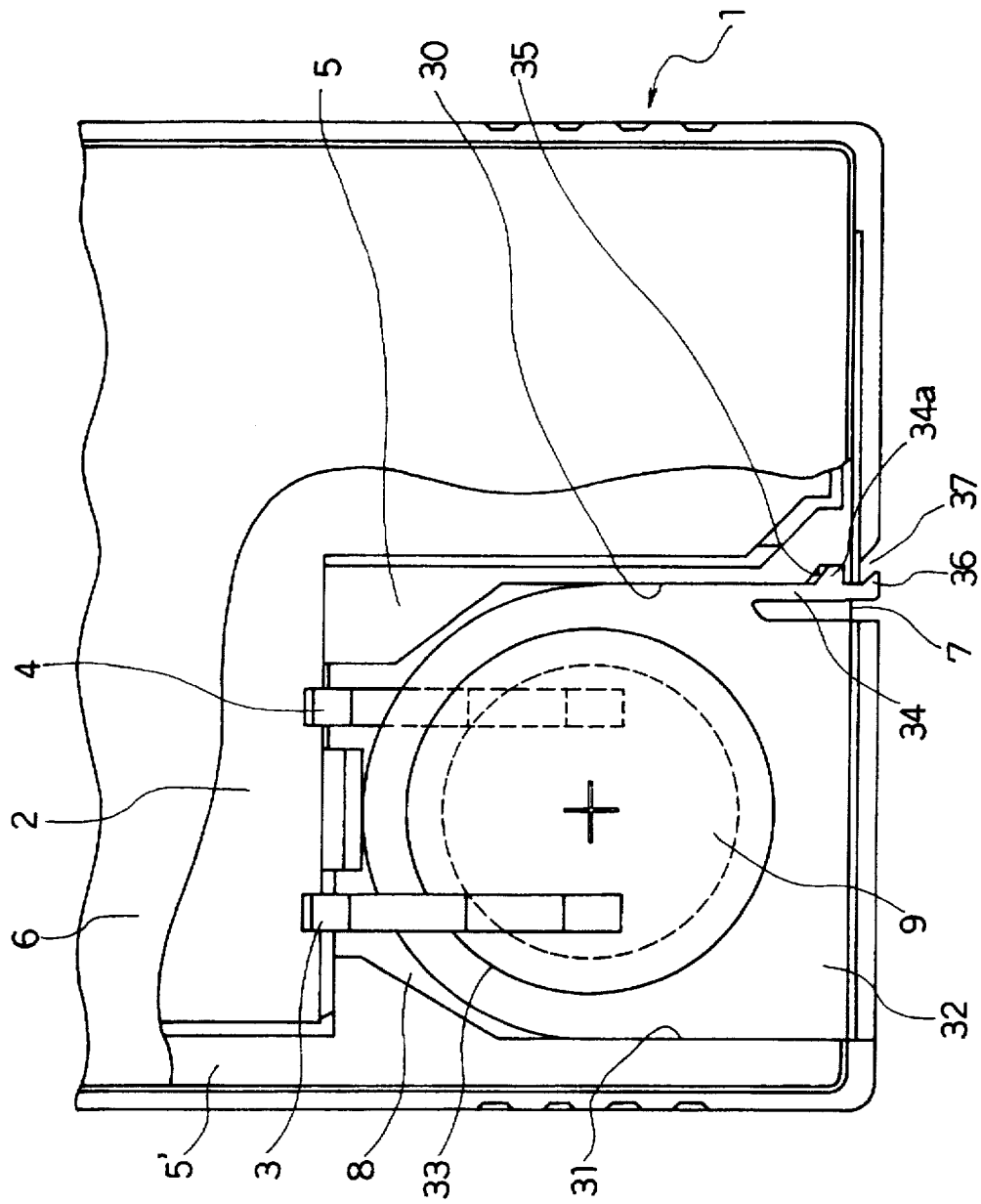
FIG. 3 is a partial plan view of a conventional IC memory card.

FIG. 1 is a partial plan view of the IC memory card in one embodiment of the present invention. FIG. 1A shows in perspective view the magnified structure of the engagement releasing switch of the IC memory card. FIG. 1B shows the same IC memory card that is shown in FIG. 1 and FIG. 1A, with its battery holder 10 removed out of its casing 1. FIG. 1C shows detailed configuration of the lower center part, especially of its engagement releasing switch and its two position click stop engaging recesses. FIG. 2 is a partial plan view in the state in which an engagement releasing switch of the IC memory card as the engagement releasing means is moved in the releasing side position.

Explanation is given on a battery changeable type IC memory card shown in FIG. 1, FIG. 1A, FIG. 1B, FIG. 1C and FIG. 2 embodying the present invention. In a casing 1, a printed-circuit board 2 is contained fixed to plastic frames 5 and 5'. The printed-circuit board 2 is loaded with a memory IC, a decoding IC, and connectors and the like (neither is shown in the figure). Also, contact leads 3 and 4 of resilient metal plates for connection use to a battery 9 are fixed on the printed-circuit board 2 in the casing 1. On the front face and the back face of the plastic frames 5 and 5', a front cover plate 6 and a back cover plate 7 made of metal plate of such as aluminum are fixed. A pocket-shaped hollow space 8 opened at one end part of the casing 1 (bottom end part of FIG. 1, FIG. 1B and FIG. 2) is formed in a manner to be constituted by side walls 15 and 16 which both are parts of the plastic frame 5 and front and back covers 6 and 7. To a battery loading space 33 formed in a battery holder 10, a battery 9 is loaded. The battery holder 10 is stored in the pocket-shaped hollow space 8, which is a storing space for the battery holder in the casing. On the top face and the bottom face of the battery 9, the contact leads 3 and 4 make contact respectively therewith inside the recessed part 8 of the casing by their respective resilient action.

The battery holder 10 is made of a resilient plastic material. The lower edge cover part 12, which is facing outside, of the battery holder 10 is shaped in a flat surface having no manipulating part nor gap. Resilient engaging members 13 and 14 are provided on its both side edge parts.

Engaging projections 13a and 14a are to be engaged respectively with a engaging spot 15a provided on one outer end part of the side wall 15 of the casing recessed space 8 and an engaging recessed part 16a provided on the side wall 16. Although the engaging spot 15a is formed by the inside wall surface of an island-shaped projection in the present embodiment, as another example it is also possible to be a recessed hole provided on the side wall 15 near its end part.

An engaging face plane 13b of the engaging projection 13a is formed substantially in a right angle with respect to the moving direction of the battery holder 10 in order to securely lock the battery holder 10, while an engaging face 14b of the another engaging projection 14a is formed in a semi-circular shape in order to smoothly released when pulling said battery holder 10.

On the plastic frame 5, a switch installation space 18 which reaches down to the rear face 17 of the casing 1 are provided adjacent to the engaging spot 15a provided for making engaging with the engaging projection 13a. In this switch installation space 18, the engagement releasing switch 19 for releasing the engagement with the engaging projection 13a is provided. As is shown in FIG. 1A, the switch installation space 18 is an inverted L-letter shaped recessed space, and it has a hole 21a, which is formed in the direction parallel to the afore-mentioned flat lower edge cover part 12, on the side wall 21 at its outside turning corner. In this space 18, a switch 19 having an approximately T-letter shape shown detached in the upper part of the same figure is inserted. And in the above-mentioned hole 21a, a sliding insertion part 19b, which forms a right side arm of the T-letter shape of the switch 19, is inserted in slidable manner. A sliding part 19d of the switch 19 is a plastic bar shaped member, whereon a semi-circular projection 19c for click-stop action is provided. This projection 19c provides the click-stop action by its falling in either of one engaging recess 21b or another engaging recess 21c for respectively giving the switch the engagement position or the engagement releasing position in the switch installation space 18.

In the above-mentioned configuration, in case of replacing the battery, the process is carried out as follows.

The engagement releasing switch 19 is moved by manipulating a sliding handle piece 19a provided on its outer edge toward the side of the battery holder 10 (that is, toward the left side of FIG. 1) up to the engagement releasing position. Then, one end face 20 of the engagement releasing switch 19 pushes the engaging projection 13a, and thereby the resilient engaging member 13 is distorted as shown in FIG. 2. As a result, the engagement between the engaging projection 13a and the engaging spot 15a is released. On another engaging projection 14a, the resilient engaging member 14 is distorted slightly toward the right side by an action of taking out the battery holder 10, and thereby the battery holder 10 can be taken out by hand from the recessed space 8.

And, as is shown in FIG. 2, when the engagement is released by sliding the engagement releasing switch 19, the leftmost end face 20 of the engagement releasing switch 19 is projected toward the left side of FIG. 2 from the vertical face of the side wall 15. By this projection, the lower part of the resilient engaging member 13 is pushed leftward, and is temporarily bent and tilted. When the battery holder 10 is going to be taken out, by means of a tapered face formed by the temporarily bent resilient engaging member 13, this engagement releasing switch 19 is pushed toward the right side. Thereby, the engagement releasing switch 19 is pushed back to the position of engagement state automatically.

By any chance, after taking out the battery holder 10 from the casing 1, even if the engagement releasing switch 19 was not turned back fully to the engagement position, in the case that the battery holder 10 is inserted thereafter the safety of the battery holder 10 can be held as described below.

That is, when the battery holder 10 is inserted upwards of FIG. 1 and FIG. 2 into the pocket-shaped hollow space 8, by means of the pushing action during the sliding insertion movement of a tapered part 102 of the upper part of the battery holder 10 and its connected adjacent side edge part 101 thereto, the engagement releasing switch 19 is pushed back, from the left side position of releasing, completely to the specified right side position of the engagement state. That is, in case that the battery holder 10 is going to be restored, by pushing it lightly by finger tip for example, the resilient engaging members 13 and 14 are distorted temporarily, the engaging projections 13a and 14a are made engaged to the engaging recessed spot 15a and engaging recessed part 16a, respectively, simply but reliably. Therefore the battery holder 10 is stored and at the same time locked in the recessed space 8 of the casing.

The engagement releasing switch 19 is slidably held by holding its non-pushing end 19b of a sliding part 19d thereof so as to slide in the hole 21a provided on the wall 21. Accordingly, although it is only a tiny element, its sliding course can be kept accurately. Since the releasing switch 19 is made of a resilient plastic material, by insertion of the semi-circular projection 19c in the engaging recess 21b or 21c a reliable engagement is obtained. Therefore, by the operation of the manipulating piece 19a, a smooth and reliable movement between two stop positions with an accurate click action becomes possible. Accordingly, it cannot happen that the engagement is released only by a light touching of such as finger tip. Although the engagement releasing switch 19 is a very tiny element, it can be assembled easily and precisely only by inserting its non-pushing end 19b into the hole 21a.

The bottom face of the battery holder 10 itself is flat, and any nail-shaped disengaging projection such as engaging projection 13a is not exposed outside. Accordingly, even when, for example, the IC memory card is intended to be taken out, there is no danger that the engagement of the battery holder is mistakenly released and causing an unintentional release of the battery holder.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. An IC memory card comprising:
 a casing for containing a memory means therein and having a pocket-shaped insertion space,
 a battery holder to be slidingly inserted so as to be held in said insertion space for holding at least one battery for feeding electric power to said memory means,
 a resilient engaging member provided on a side part of said battery holder and having an engaging projection for making an engagement with an engaging spot in said casing, and
 an engagement releasing member provided in said casing for pushing said resilient engaging member thereby displacing said resilient engaging member and releasing the engagement of said engaging projection from said engaging spot.

2. An IC memory card in accordance with claim 1, wherein
 said engagement releasing member comprises;

a sliding part which is to be slid in a direction perpendicular to direction of sliding insertion of said battery holder into said casing, so as to push said resilient engaging member, and a sliding handle piece for moving said sliding part.

3. An IC memory card in accordance with claim 2, wherein said engagement releasing member comprises;

a click stop slide controlling means for providing two stopping positions at one end and at the other end of a sliding stroke of said sliding part of said engagement releasing member.

4. An IC memory card in accordance with claim 2, wherein said casing comprises;

a bearing hole for slidably receiving a sliding handle piece provided on said sliding part at a non-pushing end which is opposite to such end as to be pushed by said engaging projection.

* * * * *